US006018648A

United States Patent [19]

Duckeck et al.

[11] Patent Number: 6,018,648

[45] Date of Patent: Jan. 25, 2000

[54] PROCESS AND DEVICE FOR DISPLAYING A TRANSMITTER NAME AND A TYPE OF PROGRAM TRANSMITTED IN A DIGITAL DATA TELEGRAM ON A RADIO RECEIVER DISPLAY

[75] Inventors: Hans Duckeck, Hildesheim; Winfried Maihs, Pattensen, both of Germany

[73] Assignee: Robert Bosch GmbH, Stuttgart, Germany

[21] Appl. No.: 08/809,853

[22] PCT Filed: Jul. 6, 1996

[86] PCT No.: PCT/DE96/01214

§ 371 Date: Jul. 10, 1997

§ 102(e) Date: Jul. 10, 1997

[87] PCT Pub. No.: WO97/06612

PCT Pub. Date: Feb. 20, 1997

[30] Foreign Application Priority Data

Aug. 8, 1995 [DE] Germany .......................... 195 29 075

[51] Int. Cl.[7] .............................................. H04B 1/18

[52] U.S. Cl. .................................. 455/154.2; 455/158.2; 455/158.4; 455/158.5; 455/161.2; 455/159.2; 455/186.1

[58] Field of Search ............................ 455/158.5, 158.1, 455/158.2, 158.4, 161.2, 154.1, 154.2, 185.1, 186.1, 186.2, 159.1, 159.2

[56] References Cited

U.S. PATENT DOCUMENTS

| | | | |
|---|---|---|---|
| 4,232,301 | 11/1980 | Nomoto | 455/158.4 X |
| 5,237,420 | 8/1993 | Hayashi | 455/158.5 X |
| 5,345,607 | 9/1994 | Liman et al. | 455/186.1 |
| 5,583,873 | 12/1996 | Miyake et al. | 455/154.1 X |

*Primary Examiner*—Wellington Chin
*Assistant Examiner*—Philip J. Sobutka
*Attorney, Agent, or Firm*—Kenyon & Kenyon

[57] ABSTRACT

A process and a device for displaying the transmitter name and type of program transmitted by a radio transmitter in a digital data telegram on the radio receiver display during a search run and where a timing element controls the display of information.

8 Claims, 1 Drawing Sheet

PROCESS AND DEVICE FOR DISPLAYING A TRANSMITTER NAME AND A TYPE OF PROGRAM TRANSMITTED IN A DIGITAL DATA TELEGRAM ON A RADIO RECEIVER DISPLAY

FIELD OF THE INVENTION

The present invention relates to a process and device for displaying the transmitter name and the type of program transmitted in a digital data telegram on a radio receiver display.

BACKGROUND OF INFORMATION

Radio transmitters have long been transmitting digital data telegrams according to the RDS standard in addition to audible broadcast signals. These data telegrams contain identifiers (PS) for the transmitter name, e.g., NDR1, NDR3, FFN, ANTENNA and identifiers (PTY) for the type of program, e.g., sports, news, classical. The latter identifier (PTY) is transmitted in each RDS group, i.e., 11.5 times per sec, and therefore it appears every 80 ms, whereas only the zero group is used for transmission of the transmitter identifier (PS), and the identifier is fully transmitted only after four consecutive group signals. Since the zero group is transmitted by the radio transmitter only 2–4 times per second on the average, the transmitter identifier appears on the display after 1–2 seconds at the soonest.

There are conventional devices, e.g., the Blaupunkt Berlin car radio which also analyzes the PTY identifier. The PS identifier is analyzed today by practically all RDS receivers to display the transmitter name.

The Blaupunkt Berlin car radio has a menu mode where a certain type of program can be selected and then a search run samples successively the transmitters that can be received and are transmitting a broadcast of the selected type of program. On a display with a large display capacity, the header shows the type of program selected and below that the transmitters identified are displayed in a list.

SUMMARY OF THE INVENTION

The present invention guarantees that the type of program will be displayed with all non-program-type-oriented transmitter searches even if the display has a display capacity of only one line=8 characters. In non-program-oriented transmitter searches, the type of program is identified from the data telegram received and then displayed and not derived from data selected in the menu mode as in the related art.

DETAILED DESCRIPTION OF THE INVENTION

Figure 1:
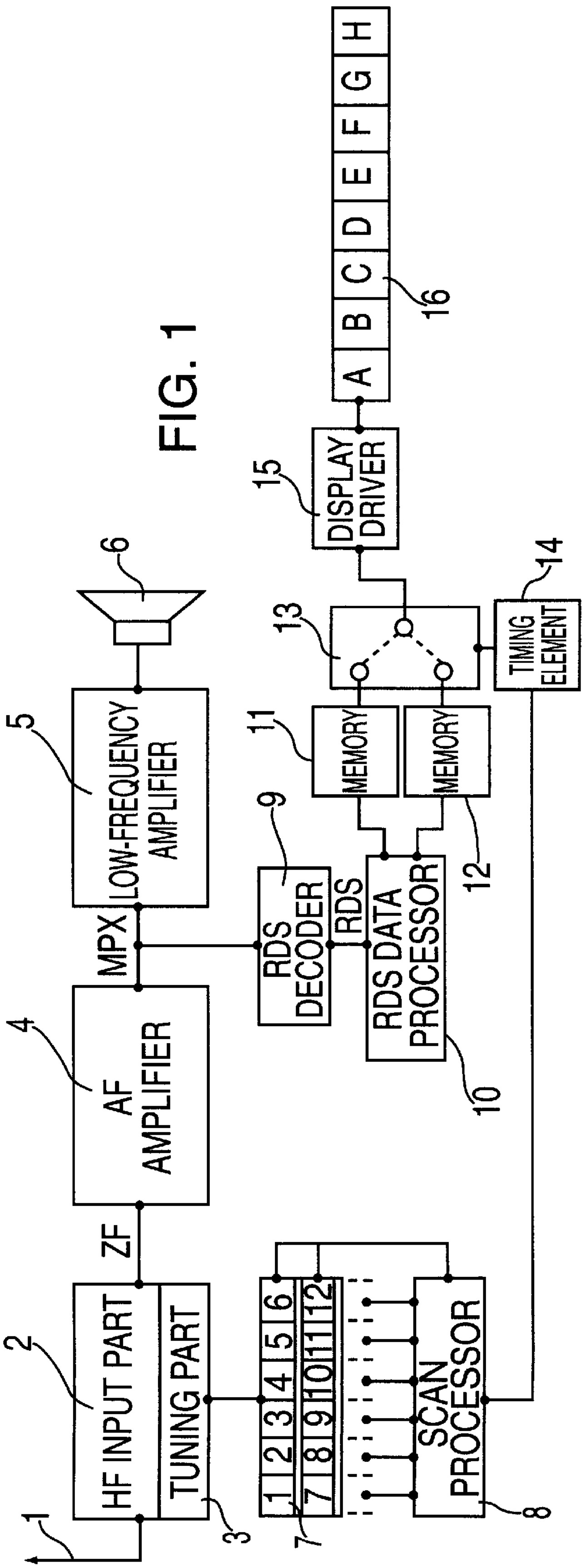
FIG. 1 shows a first embodiment of the present invention as a block diagram.

The digital RDS data telegrams of an RDS radio transmitter reach an RDS radio receiver via antenna 1 and are separated from the signals from other transmitters with the help of a tuning part 3 in an HF input part 2. The data telegrams go to an RDS decoder 9 via an AF amplifier 4 that is followed by an FM detector.

The low-frequency audio signals and optionally the respective stereo signals are processed further in a low-frequency amplifier 5 and reproduced by one or more loudspeakers 6.

Tuning part 3 is tuned by operating station keys 7 on the desired transmitter. Station keys 7 may optionally include several operating levels.

According to a transmitter search run for the transmitter receivable at the given location, a scan processor 8 invokes the individual station keys 7 in succession and may also detect the individual operating levels. Scan processor 8 can also control the tuning of the entire frequency band for receivable transmitters. A particular feature of the controller is that when scan processor 8 leaves the transmitters that have been identified after a brief sampling time of 8 seconds, for example, it proceeds to the next transmitter unless the listener interrupts this automatic feature.

In this known tuning method, only the name of the transmitter received has been displayed during the sampling time of the transmitter search run. However, since spoken contributions and music contributions may follow each other with various types of programs today, the listener may not be inclined to continue listening to a transmitter selected because that transmitter is broadcasting a music selection but the listener is searching for a sports broadcast. However, if the type of program were displayed, the listener could discover from the display when a sports transmitter has been tuned that this transmitter will soon be transmitting sports news again and then the listener could terminate the search run. In the converse case, it is also advantageous to display the type of program when the listener likes the music selection being transmitted at the moment but would continue the search if he knew that this would soon be followed by a spoken contribution whose content would not interest him at all. It is therefore desirable if the type of program is also displayed in such a transmitter search run.

The circuit connected to RDS decoder 9 is used for this display. In RDS data processor 10 the PTY identifier and PS identifier are filtered out of the numerous information signals transmitted over the RDS data telegram, and the type of program of the transmitter selected is stored in a memory 11 and the transmitter name of the transmitter selected is stored in a memory 12.

The outputs of both memories 11, 12 lead to a switch 13 that connects memory 11 to the input of a display driver 15 in its upper position. The type of program is presented on display 16 by means of this display driver 15.

As mentioned above, program type identifier PTY is available after undisturbed reception for 80 ms after tuning to the transmitter. RDS processor 10, however, needs at least one second for recognition of the transmitter name identifier PS, and if reception has errors it may need up to two seconds. The zero group must be inserted with the corresponding frequency into the RDS data telegrams at the transmitter end.

Two seconds after a change in tuning, a timing element 14 causes switch 13 to enter its second position, so that now the transmitter name is read out of memory 12 and displayed on display 16. Timing element 14 is designed as a repeating element, so that the information displayed on the display changes again after two more seconds.

Thus, with a search run that resumes automatically and has a pause of eight seconds, two types of program type displays and two transmitter name displays appear in alternation. If the listener does not want to advance to the next transmitter and operates the respective key on scan processor 8, then switch 13 remains in its second position and displays the transmitter name continuously.

Figure 2:
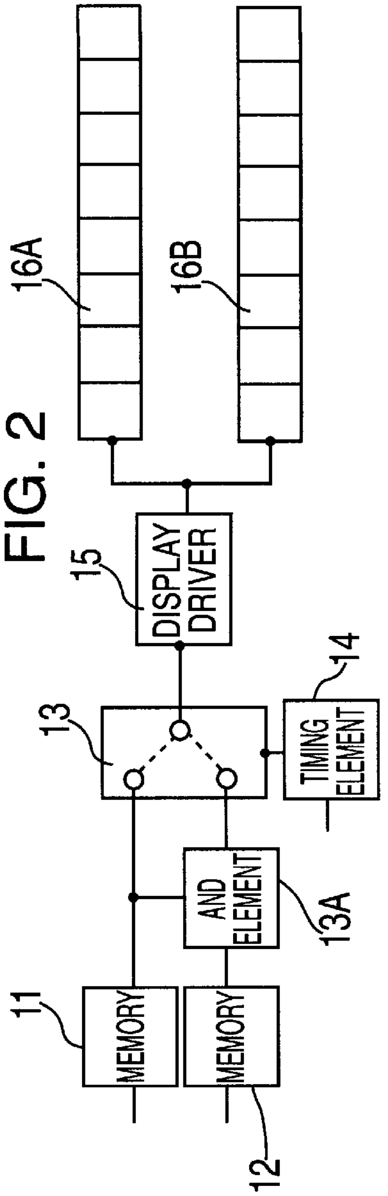
FIG. 2 shows a portion of the block diagram illustrated in FIG. 1 with a modification according to a second embodiment of the present invention.

FIG. 2 shows a modification of this circuit in the area of switch 13. In this embodiment according to the present invention, an AND element 13A is connected upstream from the second input of switch 13, so that in this position of switch 13 both the transmitter name and the type of program can be displayed on the display. This of course presupposes the use of a multiple-line display 16A/B whose lines are either arranged one below the other as illustrated in FIG. 2 or they may also be arranged in a row, thus yielding the notation:

ANTENNA. U music.

According to RDS standard, one line, i.e., a single information word, comprises a maximum of 8 characters.

With a single-line display 16, a key may also be provided in parallel with the timing element to return switch 13 back to the first position during operation of the key, so the type of program can be displayed again. One alternative to this consists of resetting switch 13 by means of the key and again triggering timing element 14.

To visualize the switching operation, it may be associated with a color change or a change in contrast in display 16.

We claim:

1. A device for displaying a transmitter name and a program type from a radio transmitter, comprising:

an RDS radio receiver locating the radio transmitter corresponding to an identified one of the program type and corresponding to an identified one of the transmitter name, the RDS radio receiver including a radio receiver display having an input;

a first memory device storing the identified program type;

a second memory device storing the identified transmitter name;

a switch coupled between the first and second memories, the switch having an output coupled to the input of the radio receiver display; and a timing element changing an operating state of the switch at a preselected time period after the identified program type is displayed, the operating state being changed to display, on the radio receiver display, the identified transmitter name together with the identified program type or alternating with the identified program type.

2. The device according to claim 1, wherein the RDS radio receiver includes a multiple-line display, and wherein the switch couples the first and second memory devices to an input of the multiple-line display after the preselected time period.

3. The device according to claim 1, wherein the RDS radio receiver includes a single-line display, and wherein the switch couples the second memory device to an input of the single-line display after the preselected time period.

4. A method for displaying a transmitter name and a program type on a radio receiver display during a non-program-oriented transmitter search run, comprising the steps of:

transmitting the transmitter name and the program type using a radio transmitter in a digital data telegram;

locating the radio transmitter corresponding to an identified one of the program type and corresponding to an identified one of the transmitter name;

displaying the identified program type on the radio receiver display after the radio transmitter is located;

generating a pause using a timing element after the identified program type is displayed; and displaying the identified transmitter name on the radio receiver display after the pause, the identified transmitter name being displayed together with the identified program type or alternating with the identified program type, wherein the steps of displaying the identified program type on the radio receiver display, generating the pause using the timing element after the identified program type is displayed and displaying the identified transmitter name on the radio receiver display after the pause are executed during, and as part of, a tuning process.

5. The method according to claim 4, wherein the tuning process is an automatic scanning process for receivable radio transmitters.

6. The method according to claim 4, wherein the tuning process includes a non-program-oriented transmitter search run.

7. A method for displaying a transmitter name and a program type on a radio receiver display during a non-program oriented transmitter search run, comprising the steps of:

transmitting the transmitter name and the program type using a radio transmitter in a digital data telegram;

locating the radio transmitter corresponding to an identified one of the program type and corresponding to an identified one of the transmitter name;

displaying the identified program type on the radio receiver display after the radio transmitter is located;

generating a pause using a timing element after the identified program type is displayed; and displaying the identified transmitter name on the radio receiver display after the pause, the identified transmitter name being displayed together with the identified program type or alternating with the identified program type, wherein the program type is stored in a first memory device, the transmitter name is stored in a second memory device, and the first and second memory devices are coupled by a switch having an output coupled to an input of the radio receiver display.

8. The method according to claim 7, wherein the timing element changes an operating state of the switch to display the identified transmitter name and the identified program type.

* * * * *